United States Patent [19]

Manico et al.

[11] Patent Number: 5,581,320
[45] Date of Patent: Dec. 3, 1996

[54] FILM CARTRIDGE WITH VISUAL INDICATOR FOR VERIFYING FILM LOADING IN CAMERA

[75] Inventors: Joseph A. Manico; Madhav Mehra, both of Rochester, N.Y.

[73] Assignee: Eastman Kodak Company, Rochester, N.Y.

[21] Appl. No.: 584,853

[22] Filed: Jan. 11, 1996

[51] Int. Cl.⁶ ............................. G03B 17/26; G03B 23/02
[52] U.S. Cl. ........................ 396/515; 242/348; 396/284
[58] Field of Search .......................... 354/275, 289.1; 242/348, 348.4

[56] References Cited

U.S. PATENT DOCUMENTS

| | | | |
|---|---|---|---|
| 1,836,699 | 12/1931 | Wood | 354/275 |
| 4,335,948 | 6/1982 | Cocco | 354/275 |
| 4,488,796 | 12/1984 | Edwards | 354/275 |
| 4,875,638 | 10/1989 | Harvey | 242/71.1 |
| 4,887,110 | 12/1989 | Harvey | 354/275 |
| 4,894,673 | 1/1990 | Beach | 354/275 |
| 5,030,978 | 7/1991 | Stoneham et al. | 354/275 |
| 5,032,861 | 7/1991 | Pagano | 354/275 |
| 5,255,039 | 10/1993 | Miller | 354/275 |
| 5,264,886 | 11/1993 | Byrd | 354/275 |
| 5,278,600 | 1/1994 | Takahashi et al. | 354/275 |
| 5,285,227 | 2/1994 | Lawther et al. | 354/275 |

*Primary Examiner*—Michael L. Gellner
*Assistant Examiner*—John Chizmar
*Attorney, Agent, or Firm*—Roger A. Fields

[57] ABSTRACT

A film cartridge comprises a housing having a film exit slit, and a film roll support rotatable inside the housing to unwind a filmstrip beginning with a film leader having several frame lengths from the film roll support to permit the film leader to be moved outwardly through the slit to accomplish film loading in a camera. A visible film-loaded indicator is located on the exterior of the housing to be seen through a window in a camera. A flexible cover strip has an opaque portion covering the film-loaded indicator to prevent the indicator from being seen and a film engaging portion located at the slit. Engageable means is located on the film leader for engagement with the film engaging portion as the film leader is moved outwardly through the slit, to make the opaque portion be drawn off the film-loaded indicator to uncover the indicator when the film leader is moved out of the housing sufficiently to accomplish film loading in a camera.

9 Claims, 7 Drawing Sheets

FILM CARTRIDGE WITH VISUAL INDICATOR FOR VERIFYING FILM LOADING IN CAMERA

CROSS-REFERENCE TO RELATED APPLICATIONS

Reference is made to commonly assigned copending applications Ser. No. 08/584480 entitled FILM CARTRIDGE WITH VISUAL INDICATOR FOR VERIFYING FILM LOADING IN CAMERA and filed Jan. 11, 1996 in the names of Joseph A. Manico and Dwight J. Petruchik, and Ser. No. 08/449032, entitled FILM SPOOL WITH BUILT-IN AUDIBLE INDICATOR FOR VERIFYING FILM LOADING IN CAMERA and filed May 24, 1995 in the name of Joseph A. Manico.

FIELD OF THE INVENTION

The invention relates generally to the field of photography, and in particular to a film cartridge with a visual indicator for verifying film loading in a camera for example.

BACKGROUND OF THE INVENTION

To load most 35 mm cameras, a film cartridge is inserted in a loading chamber of the camera and the forward end portion of a film leader protruding from a light-trapping slit in the cartridge is placed over a take-up spool in the camera. In some cameras, the forward end portion of the film leader is manually attached to the take-up spool before a rear door of the camera is closed. Then, a film loading or winding operation is performed, for example, by manually pivoting a winding lever for the take-up spool and manually depressing a shutter release button several times. This is done until the entire leader is unwound from a supply spool inside the cartridge and is wound onto the take-up spool, and the first-available film frame is positioned for exposure. In other cameras, the forward end portion of the film leader is automatically secured to the take-up spool at the beginning of the film loading operation. As the take-up spool is rotated via a motor drive, for example, one or more circumferential teeth of the spool engage the forward end portion of the film leader at its perforations to wind the leader onto the spool and position the first-available film frame for exposure. A spring-like deflector or other suitable means may be provided on the rear door of the camera for pressing the film leader against the take-up spool to facilitate engagement of the forward end portion of the leader by the circumferential teeth of the spool.

A problem that exists in some 35 mm cameras is that even though the photographer believes the forward end portion of the film leader is secured to the take-up spool, the forward end portion may fail to be engaged with the spool or may become disengaged from the spool during the film loading operation. As a result, the film leader will not be wound onto the take-up spool and the first-available film frame cannot be positioned for exposure. However, since the rear door of the camera is closed, the photographer may not be aware of the malfunction.

SUMMARY OF THE INVENTION

A film cartridge comprising a housing having a film exit slit, and a film roll support rotatable inside the housing to unwind a filmstrip beginning with a film leader having several frame lengths from the film roll support to permit the film leader to be moved outwardly through the slit to accomplish film loading in a camera, is characterized by:

a visible film-loaded indicator located on the exterior of the housing to be seen through a window in a camera;

a flexible cover strip having an opaque portion covering the film-loaded indicator to prevent the indicator from being seen and a film engaging portion located at the slit; and engageable means located on the film leader for engagement with the film engaging portion as the film leader is moved outwardly through the slit, to make the opaque portion be drawn off the film-loaded indicator to uncover the indicator when the film leader is moved out of the housing sufficiently to accomplish film loading in a camera.

DETAILED DESCRIPTION OF THE INVENTION

The invention is disclosed as being embodied preferably in a film cartridge. Because the features of a film cartridge are generally known, the description which follows is directed in particular only to those elements forming part of or cooperating directly with the disclosed embodiment. It is to be understood, however, that other elements may take various forms known to a person of ordinary skill in the art.

Preferred Embodiment

Referring now to the drawings, FIGS. 1–7 show a film cartridge 10 comprising a housing 12 with a plush-lined light-trapping film exit slit 14 and a flanged film spool 16 rotatably supported inside the housing. A 35 mm filmstrip 18 having two identical series of edge perforations 20 inwardly adjacent respective longitudinal film edges 22 is loosely coiled in a film roll 24 about the film spool 16 between a pair of radial flanges, not shown, on the film spool. An inner end portion 26 of the filmstrip 18 is attached to the film spool 16. The first several frame lengths, i.e. 3–4 frame lengths, of the filmstrip 18 constitute a film leader 28. The film leader 28 forms an outermost convolution of the film roll 26 and has a partly reduced-width forward end portion 30 that initially protrudes from the film exit slit 14. See FIGS. 1, 3 and 6.

A "FILM LOADED" 32 indicator is imprinted on the exterior of the housing 12 at a location that permits the indicator to be seen through a rear window 34 of a camera 36 when the cartridge 10 is in the camera. See FIGS. 2, 4, 5, 7 and 9. A "FILM USED" indicator 38 is imprinted on the exterior of the housing 12 at a location that prevents the indicator from being seen through the rear window 34.

Figures 1, 2:
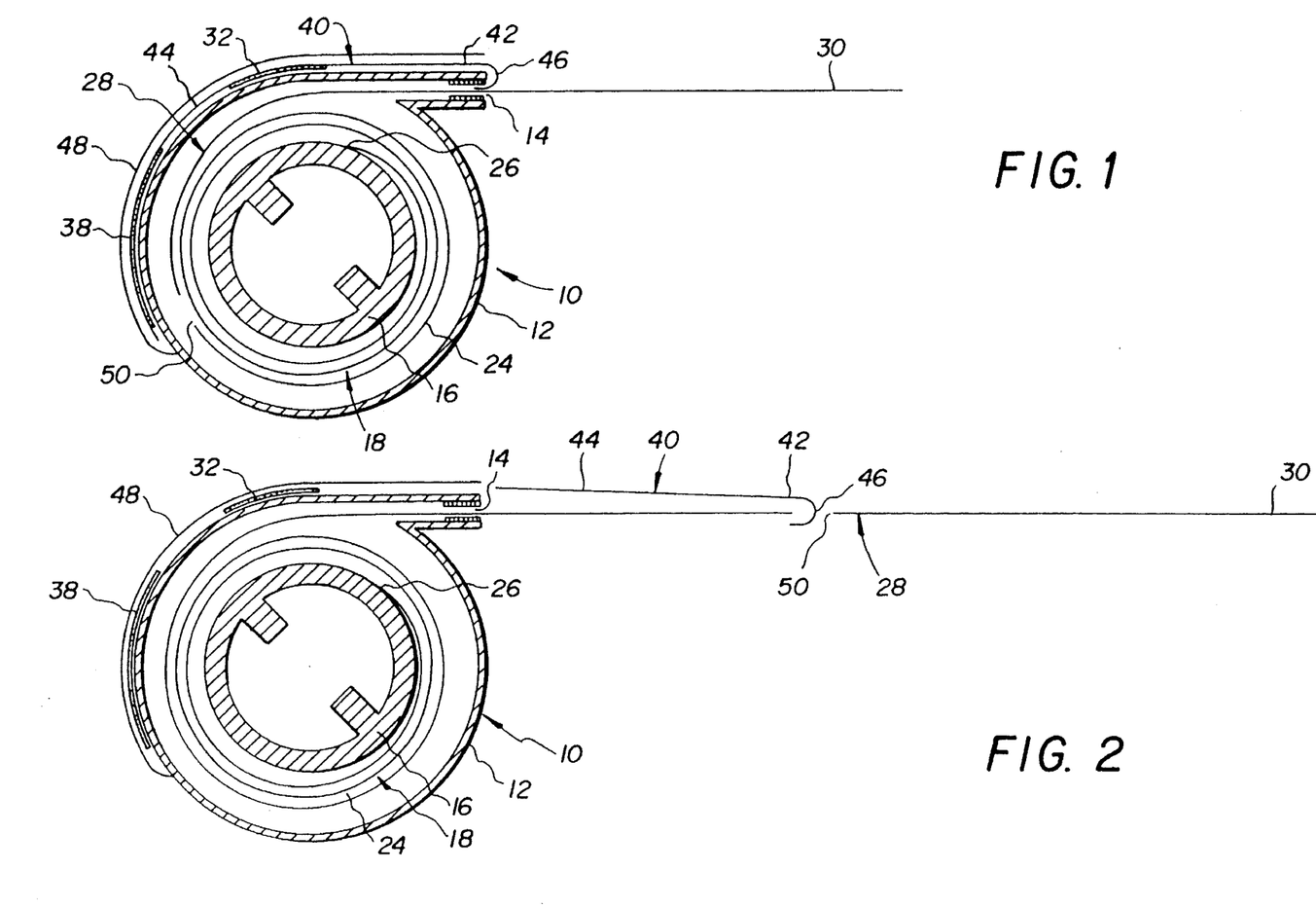
FIG. 1 is a partial section view of a film cartridge with a visual indicator for verifying film loading in a camera according to a preferred embodiment of the invention, showing the cartridge with a film leader partially protruding from the cartridge before film loading.
FIG. 2 is a partial section view similar to FIG. 1, showing the cartridge with the film leader withdrawn from the cartridge for film loading.
Figure 3:
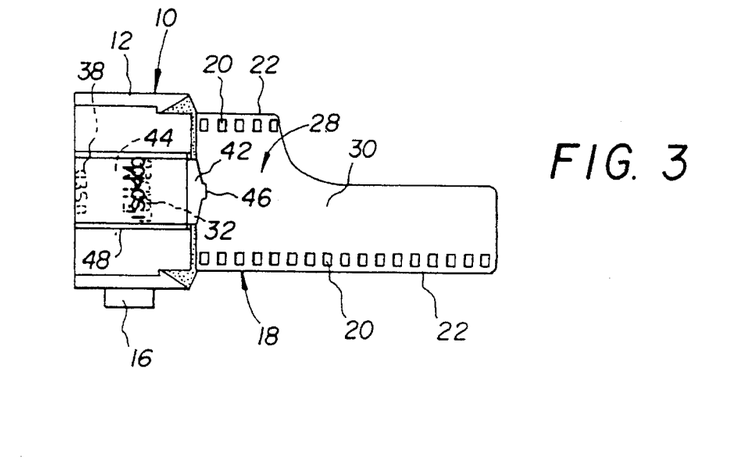
FIG. 3 is a plan view of the cartridge as seen in FIG. 1.
Figure 4:
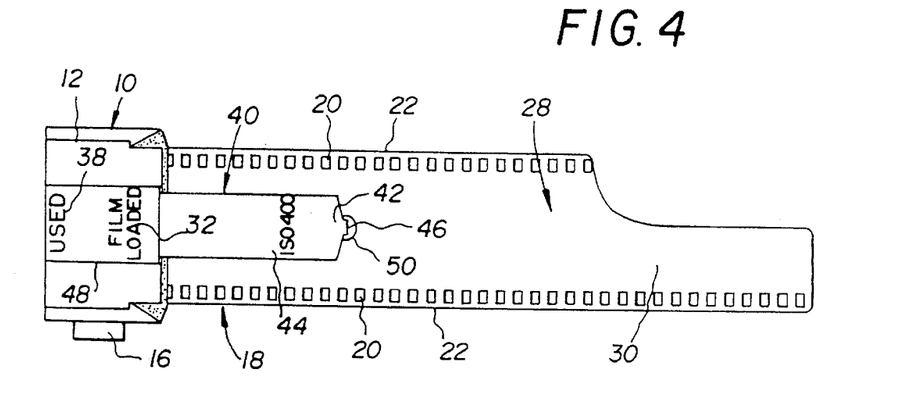
FIG. 4 is a is a plan view of the cartridge as seen in FIG. 2.
Figure 5:
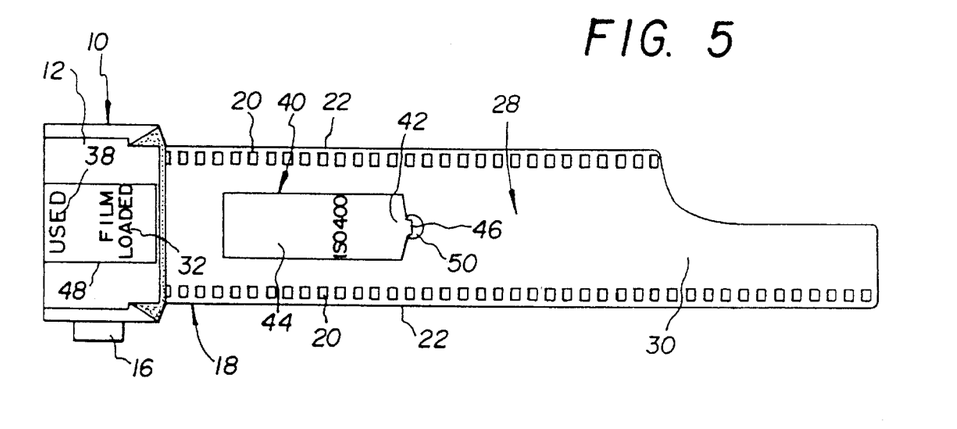
FIG. 5 is a plan view of the cartridge, showing the film leader withdrawn farther than in FIG. 2.
Figure 6:
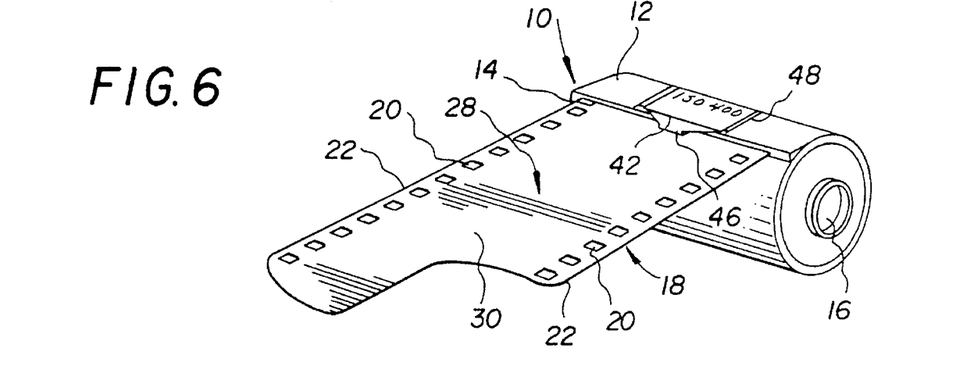
FIG. 6 is a perspective view of the cartridge as seen in FIGS. 1 and 3.
Figure 7:
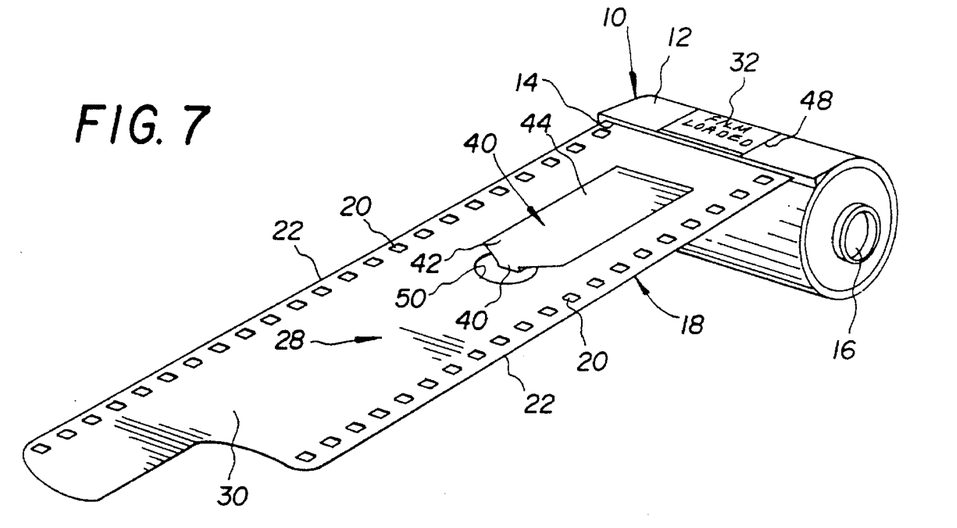
FIG. 7 is a perspective view of the cartridge as seen in FIG. 5.
Figure 8:
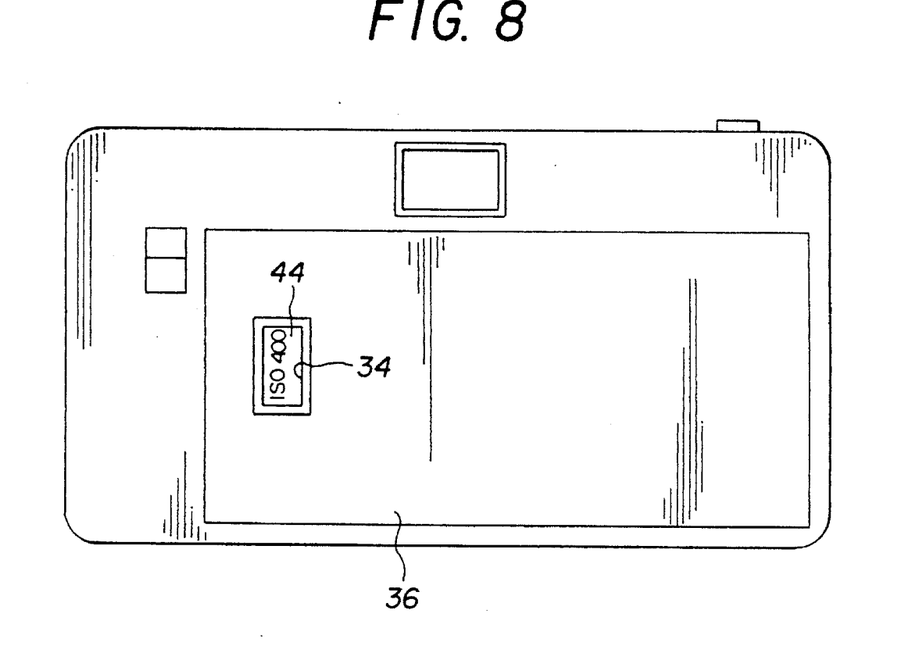
FIG. 8 is a rear elevation view of camera containing the cartridge as seen in FIGS. 1, 3 and 6.
Figure 9:
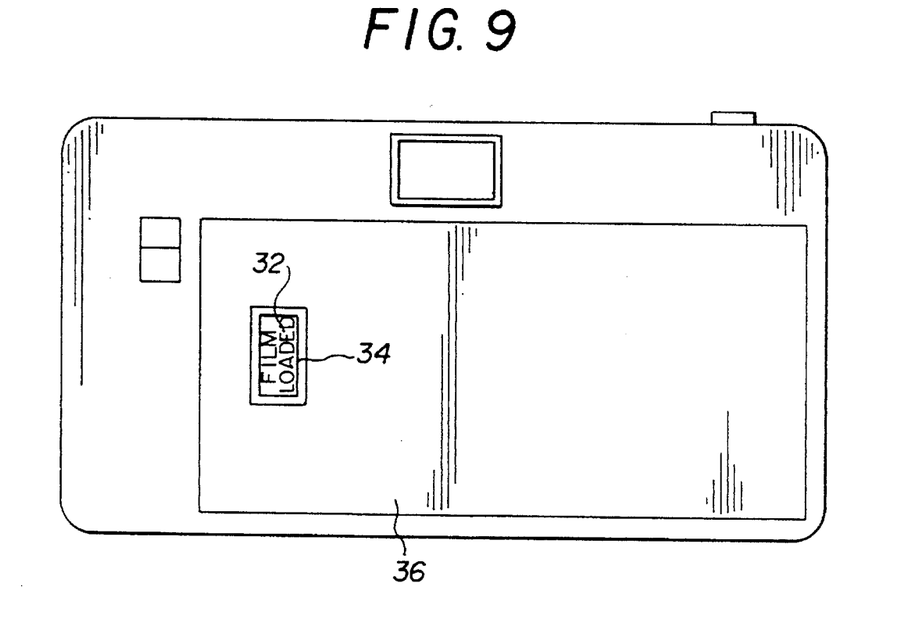
FIG. 9 is a rear elevation view of camera containing the cartridge as seen in FIGS. 2, 4, 5 and 7.

A flexible opaque cover strip 40 consists of a leading end portion 42 and a remaining trailing portion 44. The cover strip 40 is sufficiently narrower than the filmstrip 18 to be able to rest on the filmstrip between the two series of edge perforations 20 as shown in FIGS. 4, 5 and 7. The leading end portion 42 has an end hook 46 that is curved slightly into the film exit slit 14 as shown in FIG. 1, to rest on the protruding forward end portion 30 of the film leader 28. The remaining trailing portion 44 covers the "FILM LOADED" indicator 32 and the "FILM USED" indicator 38 as shown in FIGS. 1, 3 and 6.

A transparent open pocket 48 is secured to the exterior of the housing 12 to hold the remaining trailing portion 44 of the cover strip 40 in place over the "FILM LOADED" indicator 32 and the "FILM USED" indicator 38.

Operation

When the cartridge 10 is inserted in the camera 36, the "FILM LOADED" indicator 32 cannot be seen in the rear window 34 because the trailing portion 44 of the cover strip 40 is covering the indicator. See FIGS. 1, 3, 6 and 8.

The protruding forward end portion 30 of the film leader 28 is attached to a take-up spool, not shown, in the camera 36 and the spool is windingly rotated to wind the protruding forward end portion onto the take-up spool and to unwind the remaining portion of the film leader 28 that forms the outermost convolution of the film roll 26 off the film roll and onto the take-up spool. As the film leader 28 is moved out of the housing 12 and towards the take-up spool, a leader hole 50 substantially rearward in the film leader is advanced off the film roll 26 and into the film exit slit 14. When the leader hole 50 begins to emerge from the film exit slit 14, the end hook 46 drops into the leader hole to engage the leading end portion 42 of the cover strip 40 to the film leader 28. Then, the leading end portion 42 of the cover strip 40 is moved in engagement with the film leader 28. Consequently, the remaining trailing portion 44 of the cover strip 40 is pulled out of the pocket 48 to successively uncover the "FILM USED" indicator 38 and the "FILM LOADED" indicator 32. See FIGS. 1–9. Thus, as shown in FIGS. 2, 4, 5 and 7, the "FILM LOADED" indicator 32 is not uncovered until the film leader 28 is substantially removed from the housing 12. This serves to verify that enough of the filmstrip 18, i.e. 3–4 frame lengths, has been unwound from the film spool 16 to wind the film leader 28 onto the take-up spool in order to accomplish film loading in the camera 36.

Alternate Embodiments

FIGS. 10–13 show a first alternate embodiment of the cartridge 10. The same reference numbers as used in FIGS. 1–7 are used in FIGS. 10–13, to indicate the various components.

Figure 10:
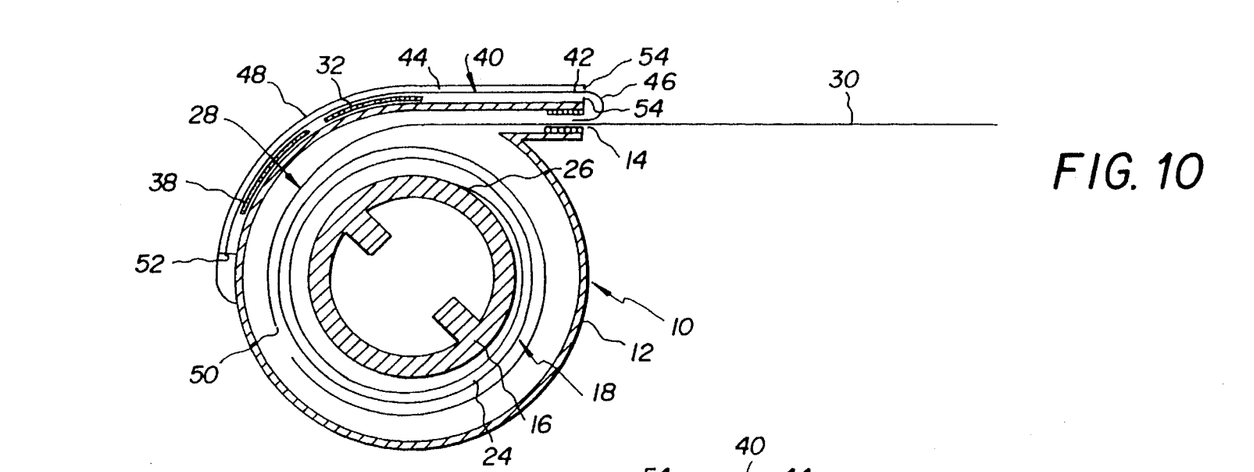
FIG. 10 is a partial section view of a film cartridge with a visual indicator for verifying film loading in a camera according to a first alternate embodiment of the invention, showing the cartridge with a film leader partially protruding from the cartridge before film loading.
Figure 11:
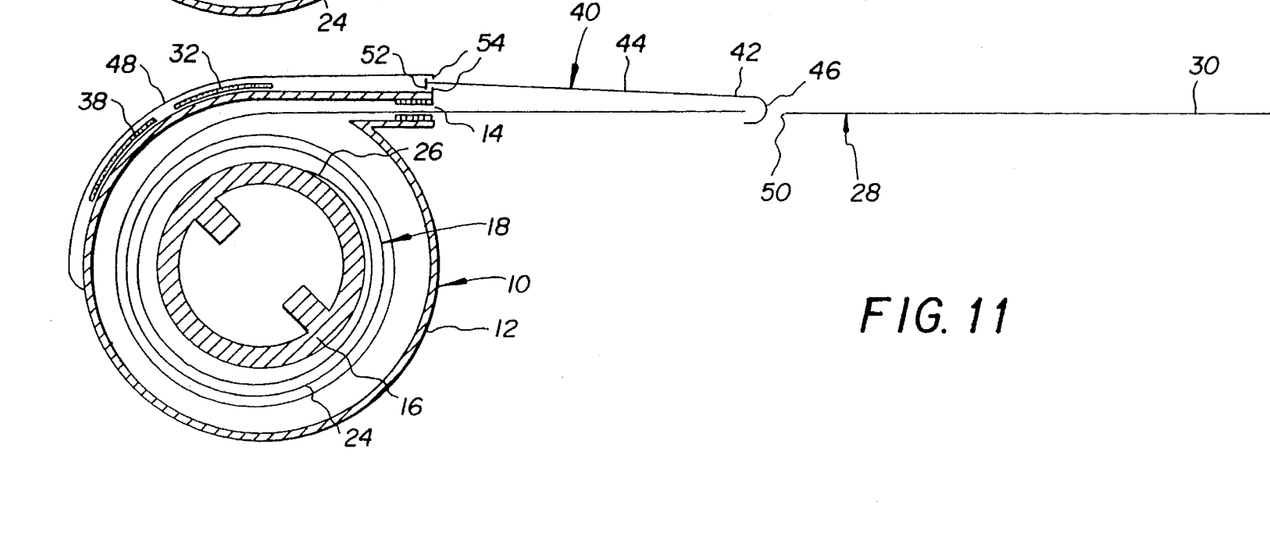
FIG. 11 is a partial section view similar to FIG. 10, showing the cartridge with the film leader withdrawn from the cartridge for film loading.
Figure 12:
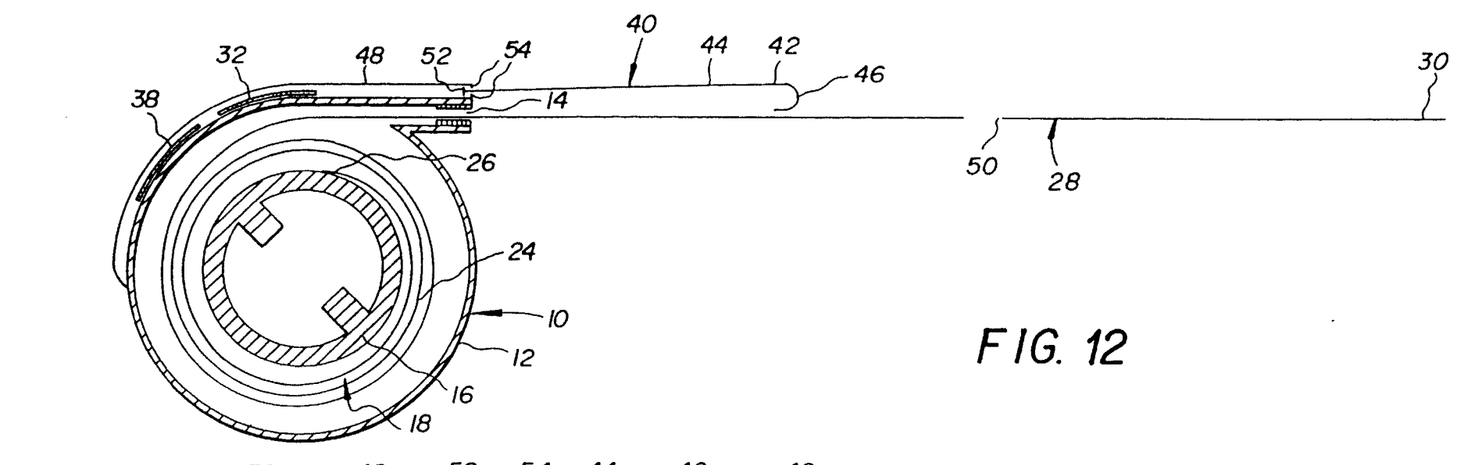
FIG. 12 is a partial section view similar to FIG. 10, showing the cartridge with the film leader withdrawn from the cartridge farther than in FIG. 11.

The only difference between the cartridge 10 in FIGS. 1–7 and the cartridge 10 in FIGS. 10–13 is that in FIGS. 10–13 the remaining trailing portion 44 of the cover strip 40 has a t-shaped end stop 52 that is intended to abut a pair of spaced stop lips 54 of the pocket 48 to prevent the remaining trailing portion from being pulled completely out of the pocket as shown in FIGS. 11 and 12.

The operation of the cartridge 10 in FIGS. 10–12 is somewhat similar to the operation of the cartridge 10 in FIGS. 1–7. The protruding forward end portion 30 of the film leader 28 is attached to a take-up spool, not shown, in the camera 36 and the spool is windingly rotated to wind the protruding forward end portion onto the take-up spool and to unwind the remaining portion of the film leader 28 that forms the outermost convolution of the film roll 26 off the film roll and onto the take-up spool. As the film leader 28 is moved out of the housing 12 and towards the take-up spool, the leader hole 50 substantially rearward in the film leader is advanced off the film roll 26 and into the film exit slit 14. When the leader hole 50 begins to emerge from the film exit slit 14, the end hook 46 drops into the leader hole to engage the leading end portion 42 of the cover strip 40 to the film leader 28. Then, the leading end portion 42 of the cover strip 40 is moved in engagement with the film leader 28. Consequently, the remaining trailing portion 44 of the cover strip 40, except for the t-shaped end stop 52, is pulled from the pocket 48 to successively uncover the "FILM USED" indicator 38 and the "FILM LOADED" indicator 32. See FIGS. 10–12. Thus, the "FILM LOADED" indicator 32 is not uncovered until the film leader 28 is substantially removed from the housing 12. This serves to verify that enough of the filmstrip 18, i.e. 3–4 frame lengths, has been unwound from the film spool 16 to wind the film leader 28 onto the take-up spool in order to accomplish film loading in the camera 36.

Further winding of the film leader 28 onto the take-up spool causes the leader hole 50 to become separated from the end hook 46. See FIG. 12. The end hook 46 is flexible, which allows it to be straightened to escape the leader hole 50 without damaging the annular region of the film leader 28 surrounding the leader hole. Once the end hook 46 is out of the leader hole 50, it recovers its original curved shape as shown in FIG. 12.

Figure 13:
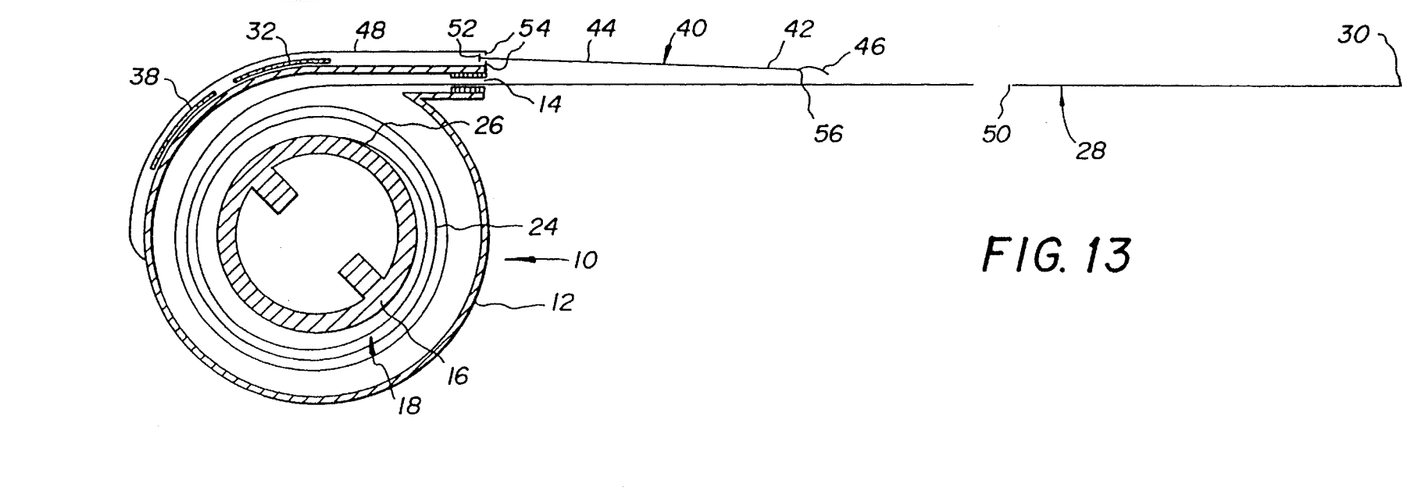
FIG. 13 is a partial section view similar to FIG. 12, showing a variation in design.

Alternatively, as shown in FIG. 13, the end hook 46 has a line of weakness 56 which allows the end hook to be straightened to escape the leader hole 50 without damaging the annular region of the film leader 28 surrounding the leader hole. When the end hook 46 is out of the leader hole 50, it tends to remain straightened rather than recover its original curved shape.

Figure 14:
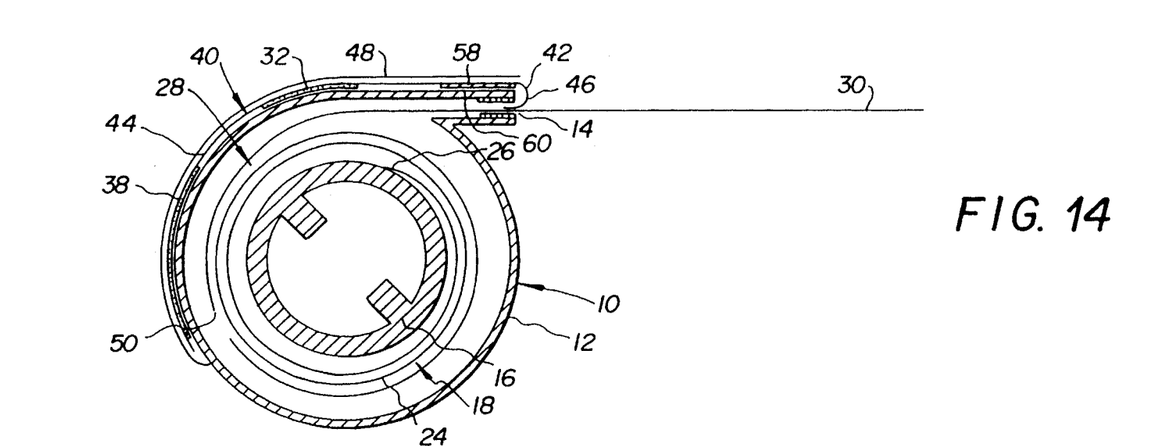
FIG. 14 is a partial section view of a film cartridge with a visual indicator for verifying film loading in a camera according to a second alternate embodiment of the invention, showing the cartridge with a film leader partially protruding from the cartridge before film loading.
Figure 15:
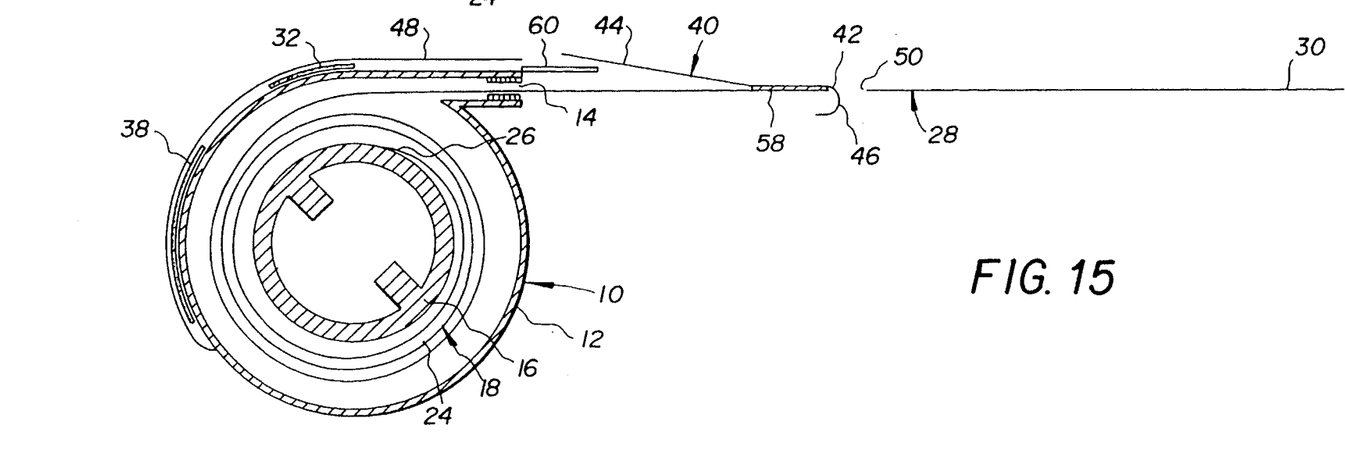
FIG. 15 is a partial section view similar to FIG. 14, showing the cartridge with the film leader withdrawn from the cartridge for film loading.

FIGS. 14 and 15 show a second alternate embodiment of the cartridge 10. The same reference numbers as used in FIGS. 1–7 are used in FIGS. 14 and 15, to indicate the various components.

The only difference between the cartridge 10 in FIGS. 1–7 and the cartridge 10 in FIGS. 14 and 15 is that in FIGS. 14 and 15 the leading end portion 44 of the cover strip 40 has a tacky or adhesive underside region 58 adjacent the end hook 46 that as shown in FIG. 14 contacts a waxy or slippery region 60 on the exterior of the housing 12 to temporarily adhere the leading end portion to the exterior of the housing, to hold the remaining trailing portion 44 of the cover strip over the "FILM LOADED" indicator 32 and the "FILM USED" indicator 38 with the end hook 46 at the film exit slit 14. The waxy region 60 preferably is a piece of wax paper that is fixed at one end to the exterior of the housing 12 and can be partially peeled away from the exterior of the housing as shown in FIG. 15.

The operation of the cartridge 10 in FIGS. 14 and 15 is somewhat similar to the operation of the cartridge 10 in FIGS. 1–7. The protruding forward end portion 30 of the film leader 28 is attached to a take-up spool, not shown, in the camera 36 and the spool is windingly rotated to wind the protruding forward end portion onto the take-up spool and to unwind the remaining portion of the film leader 28 that forms the outermost convolution of the film roll 26 off the film roll and onto the take-up spool. As the film leader 28 is moved out of the housing 12 and towards the take-up spool, the leader hole 50 substantially rearward in the film leader is advanced off the film roll 26 and into the film exit slit 14. When the leader hole 50 begins to emerge from the film exit slit 14, the end hook 46 drops into the leader hole to engage the leading end portion 42 of the cover strip 40 to the film leader 28. Then, the leading end portion 42 of the cover strip 40 is moved in engagement with the film leader 28 to first partially peel the wax paper 60 off the exterior of the housing 12, then to separate the tacky region 58 from the wax paper, and then to relocate the tacky region on the film leader 28 adjacent the leader hole 50. The remaining trailing portion 44 of the cover strip 40 is pulled from the pocket 48 to successively uncover the "FILM USED" indicator 38 and the "FILM LOADED" indicator 32. See FIGS. 10–12. Thus, the "FILM LOADED" indicator 32 is not uncovered until the film leader 28 is substantially removed from the housing 12. This serves to verify that enough of the filmstrip 18, i.e. 3–4 frame lengths, has been unwound from the film spool 16 to wind the film leader 28 onto the take-up spool in order to accomplish film loading in the camera 36.

The invention has been described with reference to a preferred embodiment. However, it will be appreciated that variations and modifications can be effected by a person of ordinary skill in the art without departing from the scope of the invention. For example, a second leader hole identical to the leader hole 50 can be provided in the film leader 28 closely behind the first hole to allow the end hook 46 to drop into the second hole in the event the end hook fails to drop into the first hole. This further ensures engagement of the film leader 28 with the leading end portion 42 of the cover strip 40. Alternatively, more than one end hook 46 can be provided to simultaneously drop into respective leader holes.

PARTS LIST 10. film cartridge
12. housing
14. slit
16. film spool
18. filmstrip
20. film perforations
22. longitudinal film edges
24. film roll
26. film inner end portion
28. film leader
30. protruding forward end portion
32. "FILM LOADED" indicator
34. rear window
36. camera
38. "FILM USED" indicator
40. cover strip
42. leading end portion
44. remaining trailing portion
46. end hook
48. pocket
50. leader hole
52. end stop
54. stop lips
56. line of weakness
58. tacky region
60. waxy region

We claim:

1. A film cartridge comprising a housing having a film exit slit, and a film roll support rotatable inside said housing to unwind a filmstrip beginning with a film leader having several frame lengths from said film roll support to permit said film leader to be moved outwardly through said slit to accomplish film loading in a camera, is characterized by:

a visible film-loaded indicator located to be seen through a window in a camera;

a flexible cover strip having an opaque portion covering said film-loaded indicator to prevent the indicator from being seen and a film engaging portion located at said slit; and engageable means located on said film leader for engagement with said film engaging portion as the film leader is moved outwardly through said slit, to make said opaque portion be moved off said film-loaded indicator to uncover the indicator when said film leader is moved out of said housing sufficiently to accomplish film loading in a camera.

2. A film cartridge as recited in claim 1, wherein said film engaging portion of the cover strip is bent slightly into said slit.

3. A film cartridge as recited in claim 1, wherein said film-loaded indicator is located on the exterior of said housing, a pocket is secured to the exterior of said housing to hold said opaque portion of the cover strip over said film-loaded indicator with said film engaging portion of the cover strip at said slit and is transparent to permit the film-loaded indicator to be seen when it is uncovered.

4. A film cartridge as recited in claim 1, wherein said film-loaded indicator is located on the exterior of said housing, a transparent pocket is secured to the exterior of said housing to hold said opaque portion of the cover strip over said film-loaded indicator with said film engaging portion of the cover strip at said slit and is open to permit the opaque portion to be drawn out of said pocket as said film leader is moved out of said housing in engagement with the film engaging portion.

5. A film cartridge as recited in claim 4, wherein said filmstrip has a pair of longitudinal edges and a plurality of film perforations along at least one of said longitudinal edges, and said cover strip is narrower than said filmstrip to allow the cover strip to be located on said film leader without blocking said film perforations in the film leader as the film leader is moved out of said housing in engagement with said film engaging portion of the cover strip.

6. A film cartridge as recited in claim 1, wherein said film-loaded indicator is located on the exterior of said housing, a transparent pocket is secured to the exterior of said housing to hold said opaque portion of the cover strip over said film-loaded indicator with said film engaging portion of the cover strip at said slit and is open to permit the opaque portion to be drawn out of said pocket as the film leader is moved out of said housing in engagement with the film engaging portion, said opaque portion of the cover strip and said pocket have respective stop means for engaging one another to prevent the opaque strip from being drawn completely out of the pocket, and said film engaging portion of the cover strip and said engageable means of said film leader are constructed to disengage as the film leader is moved out of said housing when said respective stop means are engaging one another.

7. A film cartridge as recited in claim 6, wherein said film engaging portion of the cover strip is compliant to disengage from said engageable means of said film leader as the film leader is moved out of said housing when said respective stop means of said pocket and said opaque portion of the cover strip are engaging one another.

8. A film cartridge as recited in claim 7, wherein said film engaging portion of the cover strip has a weakened region that permits the film engaging portion to substantially flatten when it is disengaged from said engageable means of said film leader.

9. A film cartridge as recited in claim 1, wherein said cover strip has a tacky-like substance proximate its film engaging portion to contact a waxy-like substance on said housing for adhering the cover strip to the housing to hold said opaque portion of the cover strip over said film-loaded indicator with the film engaging portion at said slit, but which is pulled off said waxy-like substance and onto said film leader to adhere the film engaging portion to the film leader as the film leader is moved out of the housing in engagement with the film engaging portion.

\* \* \* \* \*